United States Patent [19]

Purdy

[11] 4,163,165
[45] Jul. 31, 1979

[54] PERMANENT MAGNET MOTOR

[75] Inventor: James A. Purdy, Sylvania, Ohio

[73] Assignee: Eltra Corporation, Toledo, Ohio

[21] Appl. No.: 825,491

[22] Filed: Aug. 18, 1977

[51] Int. Cl.² ............................................ H02K 21/78
[52] U.S. Cl. .................................... 310/154; 310/254
[58] Field of Search ............. 310/40 MM, 42, 89, 154, 310/258, 259, 254, 50

[56] References Cited

U.S. PATENT DOCUMENTS

| 3,090,877 | 5/1963 | Baumhart | 310/154 |
| 3,135,887 | 6/1964 | Schaffan | 310/154 |
| 3,401,282 | 9/1968 | Zagovski | 310/42 |
| 4,118,644 | 10/1978 | Schulte et al. | 310/42 |

Primary Examiner—Donovan F. Duggan
Attorney, Agent, or Firm—Robert E. Greenstien

[57] ABSTRACT

A permanent magnet motor is provided which has first and second U-shaped sections comprising the motor stator. Each section is constructed of low reluctance magnetic material. The motor armature shaft passes through a hole in the bight of each section and carries a commutator. An air space separates the bight and shaft to provide a high reluctance path to the shaft. The two parallel sides of the first section fit between the two sides of the second section in a contact relation; the combination defining a two piece magnetic circuit that passes around the motor from end to end. The first section contains a permanent magnet mounted upon each of the sides at diametrically opposite locations adjacent the armature. The flux coupling the two magnets passes through the armature core. The magnets define a pole pair and are spaced very close to the edge of the armature core to minimize the air gap between the armature and the magnet. The first section is unbroken and provides a homogeneous flux path between the magnets. The second section provides a parallel-secondary flux path from the magnets. Additional low reluctance material is included on the bight of each section to compensate for the increased reluctance resulting from the hole through which the armature passes. Positioning stops are provided on the second section, which contact the first section as it is positioned, to establish the proper distal relation between the bights to accommodate the armature and commutator.

5 Claims, 3 Drawing Figures

PERMANENT MAGNET MOTOR

BACKGROUND OF THE INVENTION

This invention relates to permanent magnet, direct current motors, and more precisely to an improved stator design and method of manufacture for such motors.

Permanent magnet, direct current motors contain a stator or magnetic frame surrounding the armature rotatably mounted within the frame. The stator supports at least two permanent magnets disposed in very close proximity to the outer edge of the laminated armature core. These magnets define a pole pair with the flux passing from one magnet through the armature windings to the other magnet. The stator is constructed of a low reluctance magnetic material and completes the previous magnetic flux circuit from the magnets. Hence, a magnetic circuit analogous to an electrical circuit is traceable from one magnet through the armature windings and returning through the stator to the first magnet.

When constructing small permanent magnet motors it is necessary to achieve high power density and it becomes increasingly critical to optimize the efficiency of the stator magnetic circuit. To achieve this, the air gap between the magnets and the armature should be as small as possible. Air is of high reluctance and, therefore, produces significant flux loss across the gap. In addition, the stator should be of low reluctance material and offer uniform reluctance. This requires a stator construction devoid of air gaps. Air gaps can be produced by broken or sectionalized walls and raise the local reluctance, which produces flux loss and inferior motor performance. On the other hand, by adherence to these criteria it is possible to maintain the same flux density with even smaller magnets and a somewhat smaller stator, without any deterioration in motor performance.

Nevertheless, it becomes expensive and difficult to accomplish these ends in a small motor, particularly those of the type produced in high volume, for example windshield wiper and blower motors. The small size makes it difficult to achieve uniformily small air gaps between the magnets and armature and small stator normally can be viewed as being inherently less rigid or sturdy and, therefore, permits greater air gap variations throughout the life of the motor, not to mention during manufacture. This can produce wide variations in motor performance. It thus becomes necessary to reinforce the stator, which obviously occasions an unnecessary increase in the size and cost of the motor. At the same time, it is preferred to avoid magnetic coupling between the armature shaft and stator where the shaft passes through the armature, which can produce flux loss.

SUMMARY OF THE INVENTION

The motor of the present invention provides a motor stator or magnetic frame comprised of two overlapping U-shaped sections of magnetic material, wherein the bights of each section are directed to pass through each end of the motor and the armature shaft passes through the bight, separated therefrom by an air gap to avoid magnetic coupling. The shaft is supported externally from the bights at each motor end. The motor's permanent magnets are positioned on the parallel side portions of one U-shaped section. The magnetic flux circuit which passes between the magnets and through the armature is completed through this section. A second, parallel magnetic flux circuit is provided by the second section through the contact relation between the respective sides of each of the two U-shaped sections. Thus there are two parallel flux paths from the magnets passing through opposite motor ends. Each bight is provided with a hole through which each end of the armature shaft passes to the shaft bearings. Additional magnetic material surrounds each hole to compensate for the increased reluctance resulting from the hole.

With the foregoing in mind, it is an object of the present invention to provide for a motor stator possessing optimum magnetic circuit efficiency in the stator in an extremely durable and small mechanical arrangement.

It is also an object of the present invention to provide for a motor, which in addition to these features, affords manufacture at low cost and high volume.

Other features, benefits and objects of the present invention will become apparent to those skilled in the art from the following detailed description and claims wherein:

DETAILED DESCRIPTION

Figure 1:
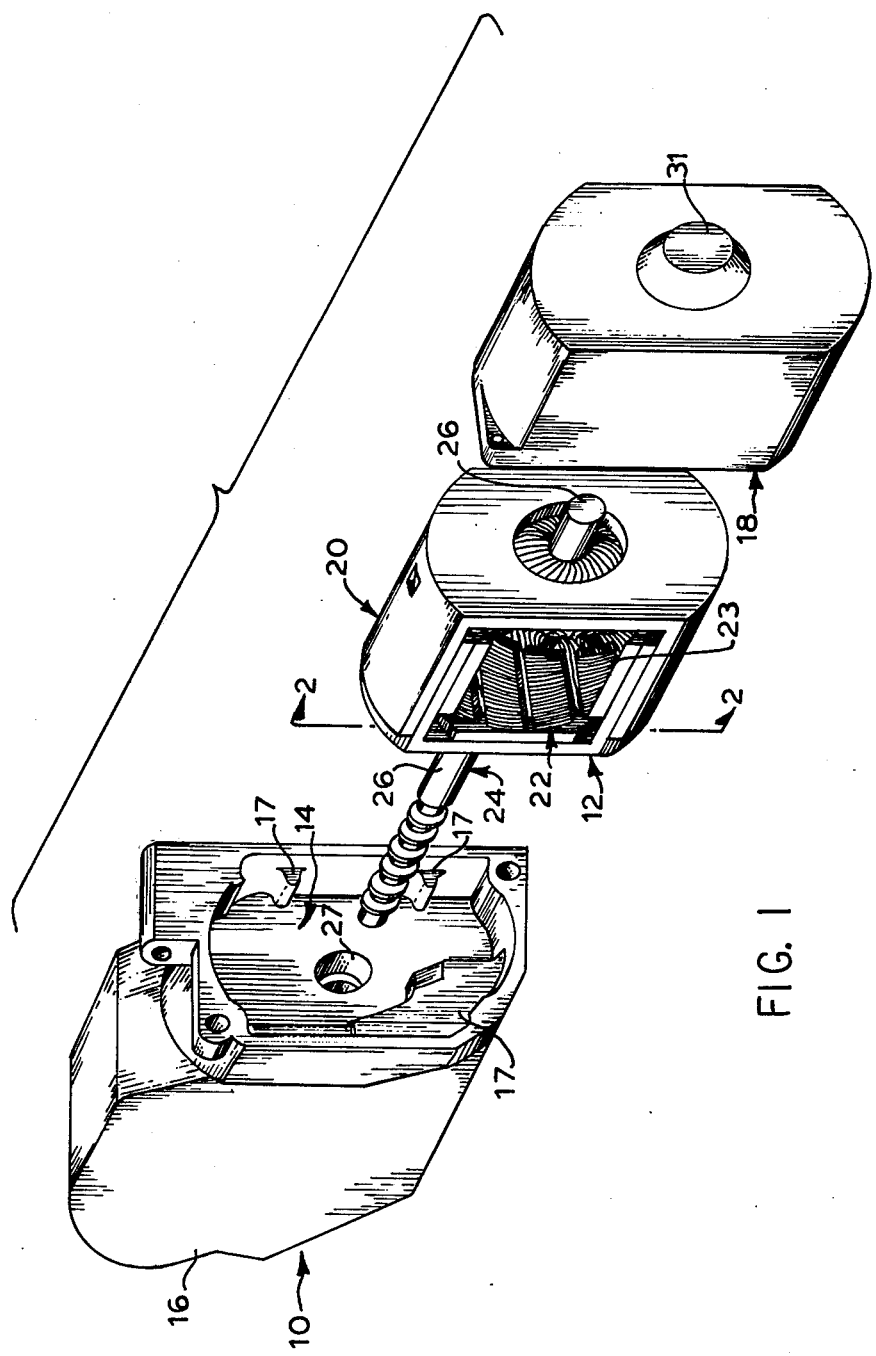
FIG. 1 is an exploded perspective view of a windshield wiper motor assembly, which employs the motor according to the present invention.

Referring to FIG. 1, reference numeral 10 designates a windshield wiper motor assembly containing a permanent magnet motor 12. Motor 12 fits into a cavity 14 that is machined in the assembly transmission case 16, as shown. Contained within cavity 14 there are a plurality of spacing lands 17, which are provided to establish a space between motor 12 and case 16 for the commutator brushes described below in detail. A motor cover 18 is provided, which is screw mounted on to the transmission case 16 once motor 12 is properly positioned.

Motor 12 can be observed to include a two-piece stator 20 and the armature 22 located therewithin. The armature shaft 24 is rotationally mounted at one end in the hole 27. Contained within hole 27, although not visible, is a sleave or ball bearing supporting the armature shaft end 26. The other shaft end, 30, is rotationally mounted in a bearing retained in the seat 30 in motor cover 18. This bearing cannot be seen in the drawing.

Figure 2:
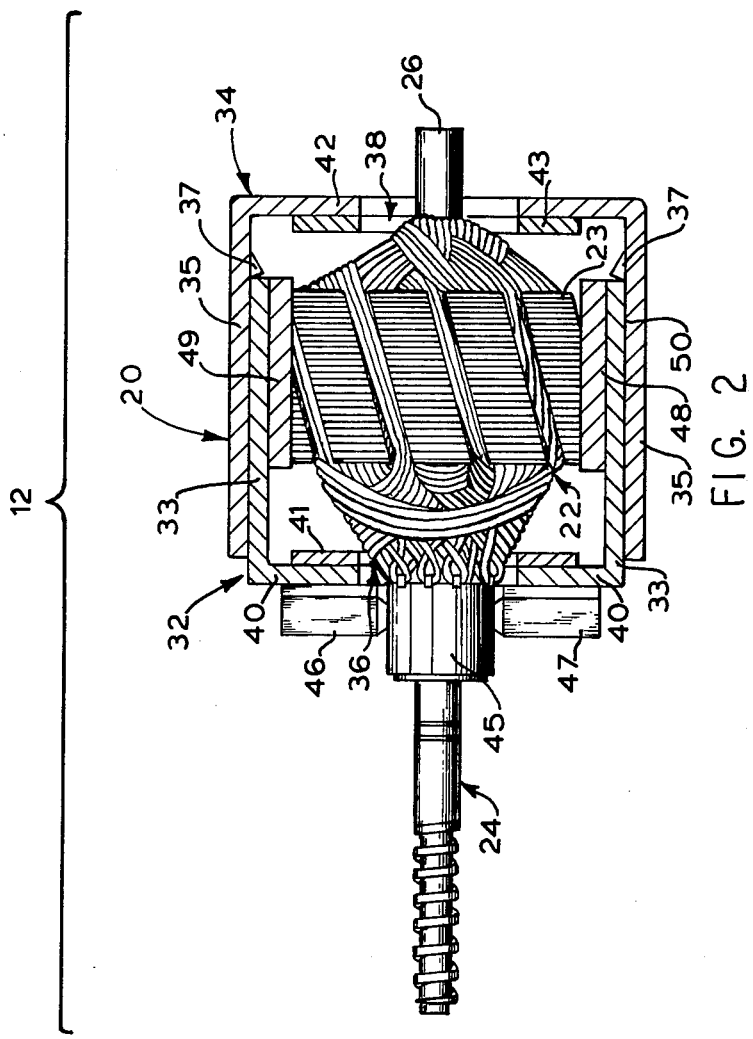
FIG. 2 shows the stator of the present invention in a cross-sectional view, along the line 2—2 in FIG. 1.

Referring now to FIG. 2, wherein motor 12 is shown in greater detail, it can be observed that stator 20 consists of two U-shaped sections 32, 34. Each of these sections 32, 34 contains a hole 36, 38 in its respective bight 40, 42. It is through these bights 40, 42, that the armature shaft 24 extends when the motor is completely assembled and by which the bight and armature shaft are magnetically insulated from each other. Armature 22 can be seen to include the commutator 45 and the commutator brushes 46, 47 mounted on bight 40, which rub on the commutator as the armature rotates.

Section 32 is somewhat smaller than section 34 and includes the curved parallel sides 33. Sides 33 fit snuggly between the also curved, corresponding parallel sides 35 of section 32, in the manner shown in FIGS.

1 & 2. Sides 35 contain inwardly extending tabs 37, which register with the edge of each side 33 to assure proper alignment and spacing between the sections 33, 34 and particularly bights 40 and 42 to receive armature 22.

Cavity 14 is machined to precisely receive the bight end section 32. This establishes a precise orientation and alignment of stator 20 within case 16. In an analogous fashion, cover 18 is shaped to fit snugly over section 34 and serves to establish the precise alignment of armature 22 within stator 20 as is supporting shaft end 26, the opposite end 24 being supported in bore 27. It should be noted that bight 20 establishes contact with lands 17, whereby the necessary space for commutator brushes 46, 47 is created in case 16.

Figure 3:
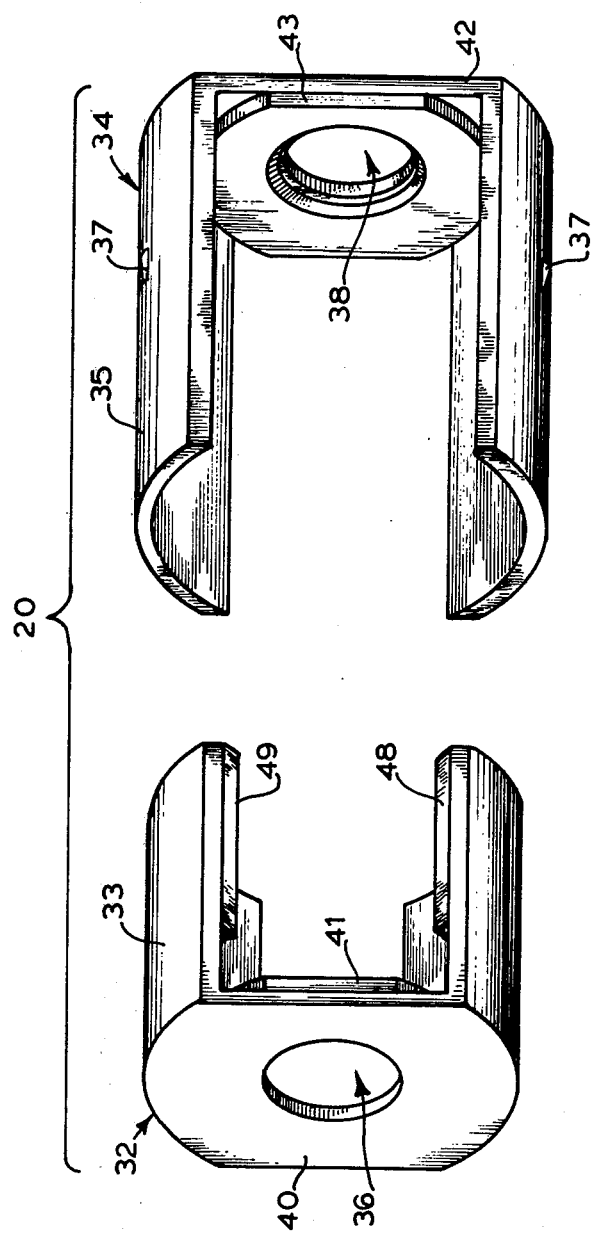
FIG. 3 is an exploded perspective view showing the two U-shaped stator sections of the present invention.

From FIG. 3, it can be observed that sides 33, 35 are curved in a coaxial configuration around armature 22. Located on the inside face of each side 33 are two permanent magnets 48, 49, which are correspondingly curved to conform with the face of sides 33 and, when mounted, are spaced as close as possible to armature core 23. (See FIG. 2) Magnets 48, 49 comprise a magnetic pole pair. The magnetic flux from the pair passes from a magnet 48, for example, through the armature core 23 to magnet 49. A return magnetic path is necessary to complete the flux circuit in a manner analogous to an electrical circuit path, and this path is supplied primarily by the stator section 32, which is constructed of low reluctance magnetic material, such as an iron alloy. Hence, and again by way of example, the flux from magnet 49, flows through the sides 33 around the armature shaft by way of bight 40, and returns to magnet 48. This can be seen to complete the magnetic circuit, completely bypassing armature shaft 24.

As noted earlier, sides 33 and 35 slide together in a contact relation. The contact must be as tight as possible and uniformly distributed over the overlapping surfaces of each section to minimize the intermediate air gap 50 and any flux loss across the air gap. A secondary-parallel flux path between the magnets is thus provided which is traced through sides 35 and around shaft 24 by way of bight 42 in a manner directly analogous to that previously described with respect to the magnetic path through section 32.

Of particular significance are the armature shaft receiving holes 36, 38 in bights 40, 42. These holes magnetically isolate the stator and armature shaft, but tend to restrict the adjacent flux path and thereby cause a locally high reluctance condition to exist. However, in the current invention, compensation is provided by the flux bypass plates 41, 43, which are welded in place on the inside of the bights 40, 42 around the holes 38, 36 to provide an alternate low reluctance flux shunt path. Welding is preferred to assure effective magnetic coupling between the bypass plate and the bight.

Assembly of the previously described motor according to the related method of assembly of the present invention proceeds as follows: The two U-shaped sections, 32, 34 are fabricated of low reluctance magnetic material and provided with holes 36, 39. The bypass plates 41, 43 are similarly constructed and fastened in position around the holes 36, 31, preferably for the reasons by welding noted above. Brushes 46, 47 are fastened to bight 40 on section 32.

Section 32 is then placed into the transmission case 16 against the spacing lands 17. Armature 22 is positioned with the shaft end 26 passing through hole 36 into the bearing retained in hole 27. Section 34 is placed over armature 22 with the shaft end passing through hole 38 and as sides 35 slide over sides 33 until tabs 37 establish contact with the edges of sides 33. At this point the stator is completely assembled. The following remaining steps establish proper armature shaft alignment within the stator. Motor cover 18 is positioned on the case with shaft end 36 disposed in the bearing carried within bearing retainer seat 31. Finally, cover 18 is fastened onto case 16 as shown to secure the stator and armature in place on case 16.

While I have hereinabove described what is at present the preferred embodiment of my invention, it will be obvious to those skilled in the art that there are many possible modifications and variations which can be made thereto, but which are nevertheless equivalent thereto and embrace the true scope and spirit of my invention. Therefore, it is intended that the claims, hereinafter set forth, cover all such modifications, variations and equivalents.

I claim:

1. A permanent magnet motor comprising:
   a stator assembly,
   permanent magnet means mounted on said assembly,
   an armature including an armature shaft rotatably supported at each motor end,
   said shaft passing through said stator, said shaft and said stator being magnetically isolated at the point of passage and
   said stator providing a homogeneous magnetic circuit for said permanent magnet means from substantially opposite sides of said armature, said circuit passing through at least one motor end and around said shaft,
   said stator comprising a U-shaped member of low reluctance material, said member characterized by two substantially parallel sides interconnected by a bight, said armature shaft passing through a hole in said bight somewhat larger than said shaft, said parallel sides supporting said permanent magnet means, and additional magnetic material surrounding the hole in said bight.

2. The permanent magnet motor of claim 1, further comprising:
   a second U-shaped section having two parallel sides interconnected by a bight, said sides being in a close contact relation with the sides of said first section, the bights of said first and second sections being in an opposed distal relation to each other to accommodate said armature and one end of said shaft passing through a somewhat larger hole in the bight of said second section.

3. The permanent magnet motor of claim 2, wherein: said second section is of low reluctance material and provides a second magnetic circuit for said magnet means which passes through the opposite motor end, said shaft being magnetically isolated from the bight of said second section and said second section including additional magnetic material around said hole in said bight.

4. The permanent magnet motor of claim 3, further comprising: commutator brush means mounted on the bight of said first section.

5. The permanent magnet motor of claim 4, further comprising:
   a two piece motor case, wherein a first piece is adapted to receive said first U-shaped section, and a second piece is adapted to receive said second U-shaped section, said first and second pieces removably attached and providing support and alignment for each end of said armature shaft.

* * * * *